United States Patent [19]

Angell

[11] Patent Number: 5,166,797
[45] Date of Patent: Nov. 24, 1992

[54] VIDEO SWITCHER WITH PREVIEW SYSTEM

[75] Inventor: Richard B. Angell, Nevada City, Calif.

[73] Assignee: The Grass Valley Group, Inc., Nevada City, Calif.

[21] Appl. No.: 633,837

[22] Filed: Dec. 26, 1990

[51] Int. Cl.$^5$ .................. H04N 2/262; H04N 9/74
[52] U.S. Cl. .................. 358/183; 358/181; 358/22
[58] Field of Search .............. 358/183, 182, 181, 22

[56] References Cited

U.S. PATENT DOCUMENTS

| | | | |
|---|---|---|---|
| 4,851,912 | 7/1989 | Jackson et al. | 358/183 |
| 4,853,784 | 8/1989 | Abt et al. | 358/22 |
| 4,947,254 | 8/1990 | Abt et al. | 358/181 |
| 4,947,256 | 8/1990 | Wood et al. | 358/182 |

Primary Examiner—James J. Groody
Assistant Examiner—Glenton B. Burgess
Attorney, Agent, or Firm—John Smith-Hill

[57] ABSTRACT

A video production switcher comprises a background mixer, a program bus for connecting a selected video source to the program input of the background mixer, and a downstream key mixer and a preview mixer each having a background input and a key fill input. The key fill inputs of the downstream key mixer and the preview mixer are each connected to receive the same key fill video signal. Each of the latter mixers combines the signal present at its background input with the signal present at its key fill input in dependence on the signal present at its control input. A preview selector connects the background input of the preview mixer selectively either to a second video source, or to the program bus, or to a third video source, and a key control switch connects the transition control input of the preview mixer selectively either to a reference potential level or to a key signal source.

11 Claims, 2 Drawing Sheets

VIDEO SWITCHER WITH PREVIEW SYSTEM

BACKGROUND OF THE INVENTION

This invention relates to a video switcher with a preview system.

A conventional video switcher receives video input signals from multiple sources, such as cameras, video tape recorders (VTRs) and graphics generators, selects a subset of input video signals from the set of available video signals, and combines the selected subset of signals to form a single video output signal, which may be applied to a transmitter for broadcasting.

FIG. 1 shows a typical video production switcher that includes an input selector 2, a mix-effects (ME) device 6, a program bus 14, a preset bus 18 and a downstream keyer 10. The input selector is able to connect input video signals selectively to the ME device, the program bus and the preset bus.

The ME device is able to combine two or more video signals in accordance with key signals that are associated with the video signals respectively. By way of example, the ME device 6 is shown as having two video input terminals, for receiving video signals designated as background and key fill. The key fill video signal is accompanied by a key control signal, which spatially limits the key fill signal when the video signals are combined. Consequently, the output signal of the ME device is a full field video signal in which the background occupies only areas that are not occupied by key fill. In this fashion, the scene represented by key fill appears in front of the scene represented by background. For example, the key fill scene might be a newsreader and the background a studio backdrop. In this case, in a display based on the output video signal of the ME device, the newsreader appears to be in front of the studio backdrop. Accordingly, the output video signal of an ME device can be thought of as composed of layers to which different priorities are assigned, with the lower priority layer being the background and the higher priority layer (key fill) being nearer the viewer.

The ME device 6 has a program output ME PGM, which is selectively connectable to the downstream keyer 10 by the program bus 14 or the preset bus 18. The ME device also has a preview output ME PVW.

A conventional production switcher has a control panel that includes several distinct areas. One of these areas is known as the ME NEXT TRANS control area. In the case of the switcher shown in FIG. 1, the ME NEXT TRANS area would include two buttons, marked BKGD and KEY respectively, and a transition control. If, for example, the output signal of the ME device 6 is composed of background and key fill and the KEY button is pressed, key fill is immediately removed from the signal at the preview output 32; and on the next transition of the ME device's transition control key fill is removed from the ME PGM output of the ME device so that the ME PGM output is composed only of background. If the KEY button is pressed again, key fill is restored on the next transition. Thus, when a button is pressed, the corresponding layer of the ME PVW output immediately changes state and that layer of the ME PGM output changes state on the next transition. When the program bus selects the ME PGM output, the program bus carries the signal that results from the selection and combination carried out by the ME device.

The downstream keyer 10 includes a background mixer 22 to which the program bus and the preset bus are connected. The background mixer 22 executes a transition from the signal on the program bus to the signal on the preset bus in response to a transition control signal received at a terminal 26 of the mixer from a background transition control signal generator 28, which operates in response to a transition control 30 of the downstream keyer. After a transition has been completed, the signal on the preset bus is switched to the program bus, so that the output signal BKGD of the background mixer is again the signal on the program bus. The output of the mixer 22 is applied to a program DSK mixer 24, which is used to add a further, highest priority, layer (DSK fill) to the output signal of the mixer 22 in response to a DSK key control signal. The DSK key control signal is generated by a multiplier 34 in response to a key signal (DSK key) associated with the DSK fill and a transition control signal provided by the transition control 30 of the downstream keyer. In the case of the example given above, the DSK fill might depict a news event of interest, and this occupies a limited region of the video field while the newsreader provides introductory discussion. The output of the program DSK mixer 24 constitutes the program output of the switcher.

A second area of the production switcher's control panel is known as the DSK NEXT TRANS area. The DSK NEXT TRANS control area includes the downstream keyer's transition control 30, which has been mentioned above, and two selector buttons marked BKGD and DSK. If a selector button of the DSK NEXT TRANS control area is pressed, the layer associated with that button changes to its opposite state on the next transition. For example, if the current PGM OUT signal of the downstream keyer does not include a DSK fill layer, and the button DSK is pressed, on the next transition of the downstream keyer's transition control, the DSK fill layer is added to the BKGD signal provided by mixer 22. If the button BKGD is pressed, on the next transition of the transition control the BKGD signal provided by mixer 22 changes from the program bus to the preset bus. If both buttons are pressed, on the next transition the background layer changes from the program bus to the preset bus and the DSK fill layer changes to its opposite state.

The downstream keyer also includes a preview DSK mixer 48 having one input connected to the program bus 14, a second input connected to a switch 62, which provides either the DSK key signal or zero, and a third input connected to receive the DSK fill video signal. If switch 62 selects the DSK key signal, mixer 48 adds the DSK fill layer to the signal on program bus 14; otherwise, mixer 48 passes the signal on the program bus unchanged.

The state of switch 62 depends on whether the DSK fill layer is present in the PGM OUT signal. If the DSK fill layer is present, switch 62 selects zero, and if the DSK fill layer is not present, switch 62 selects the key signal. Thus, if the DSK fill layer is present in PGM OUT, the output of mixer 48 is the program signal without DSK fill, and if the DSK fill layer is not present in PGM OUT, the output of mixer 48 is the program bus signal with DSK fill.

It is not always easy for the operator of a production switcher to predict exactly what effect will be created on the next transition of the switcher. Nevertheless, since the output signal of the switcher might be broadcast, it is important to minimize the possibility of unexpected effects. This is accomplished by use of a preview selector 40 and a preview monitor 44.

The preview selector 40 is shown in FIG. 1 as having four inputs, connected respectively to the ME PVW output of the ME device 6, the preset bus 18, the output of preview DSK mixer 48, and the PGM OUT terminal of the downstream keyer. The preview selector 40 has an output PVW OUT connected to the preview monitor 44, and may have additional inputs connected to, for example, program bus 14 and the ME PGM output of ME device 6.

It will be seen that the preview monitor 44 can provide five displays: ME PVW, PRESET, PGM OUT, PROGRAM with DSK fill, and PROGRAM without DSK fill.

It will be appreciated from the foregoing that the information provided by the preview monitor 44 does not reflect fully the changes that might occur in the PGM OUT signal following a transition of the downstream keyer's transition control. For example, the preview monitor 44 cannot provide a display of PRESET plus DSK fill, which would be the desired preview display if PGM OUT included the DSK fill layer and the BKGD button of the DSK NEXT TRANS control area was pressed. Further, the preview selector 40 of the FIG. 1 switcher is not able to provide a PVW OUT signal composed of ME PVW plus DSK fill.

SUMMARY OF THE INVENTION

In accordance with the present invention, a video production switcher comprises a background mixer having a preset video input, a program video input, a background transition control input, and a background output, a program bus for connecting a selected video source to the program input of the background mixer, and a downstream key mixer having a background input, a key fill input connected to receive a key fill video signal, a key transition control input and a program output and operative to combine the signal present at its background input with the signal present at its key fill input in dependence on the signal present at its control input. A preview mixer has a background input, a key fill input connected to receive the key fill video signal, and a preview transition control input and is operative to combine the signal present at its background input with the signal present at its key fill input in dependence on the signal present at its control input. A selector switch connects the background input of the preview mixer selectively either to a second video source, or to the program bus, or to a third video source, and a key control switch connects the control input of the preview mixer selectively either to a reference potential level or to a key signal source.

BRIEF DESCRIPTION OF THE DRAWINGS

For a better understanding of the invention, and to show how the same may be carried into effect, further reference will be made, by way of example, to the accompanying drawings in which.

In the different figures, like reference numerals designate similar components. Primed reference numerals in FIG. 2 designate components that have functions that are related to the functions of the components designated by corresponding unprimed numerals in FIG. 1.

DETAILED DESCRIPTION

Figure 1:
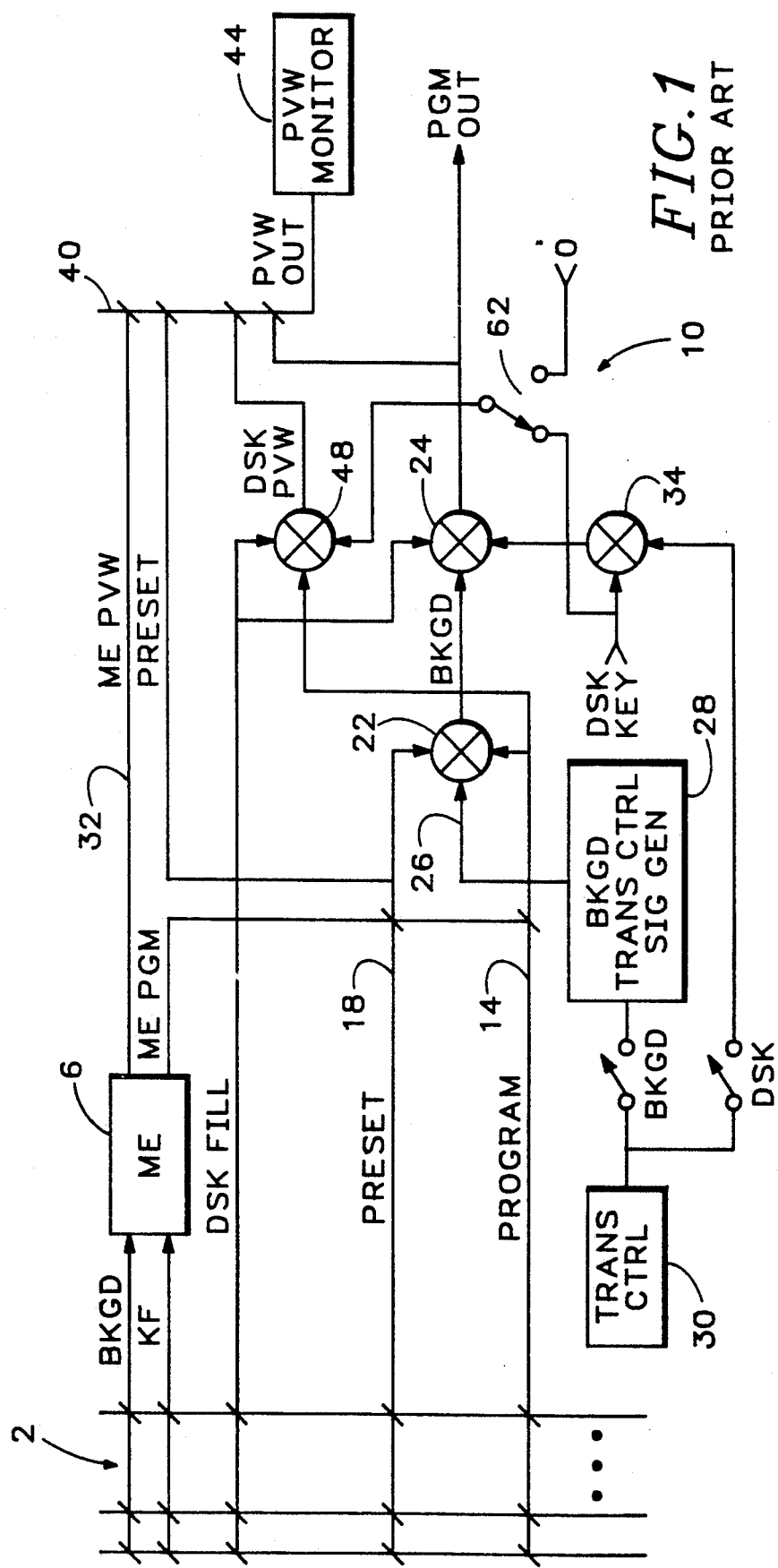
FIG. 1 is a block diagram of a known type of production switcher.
Figure 2:
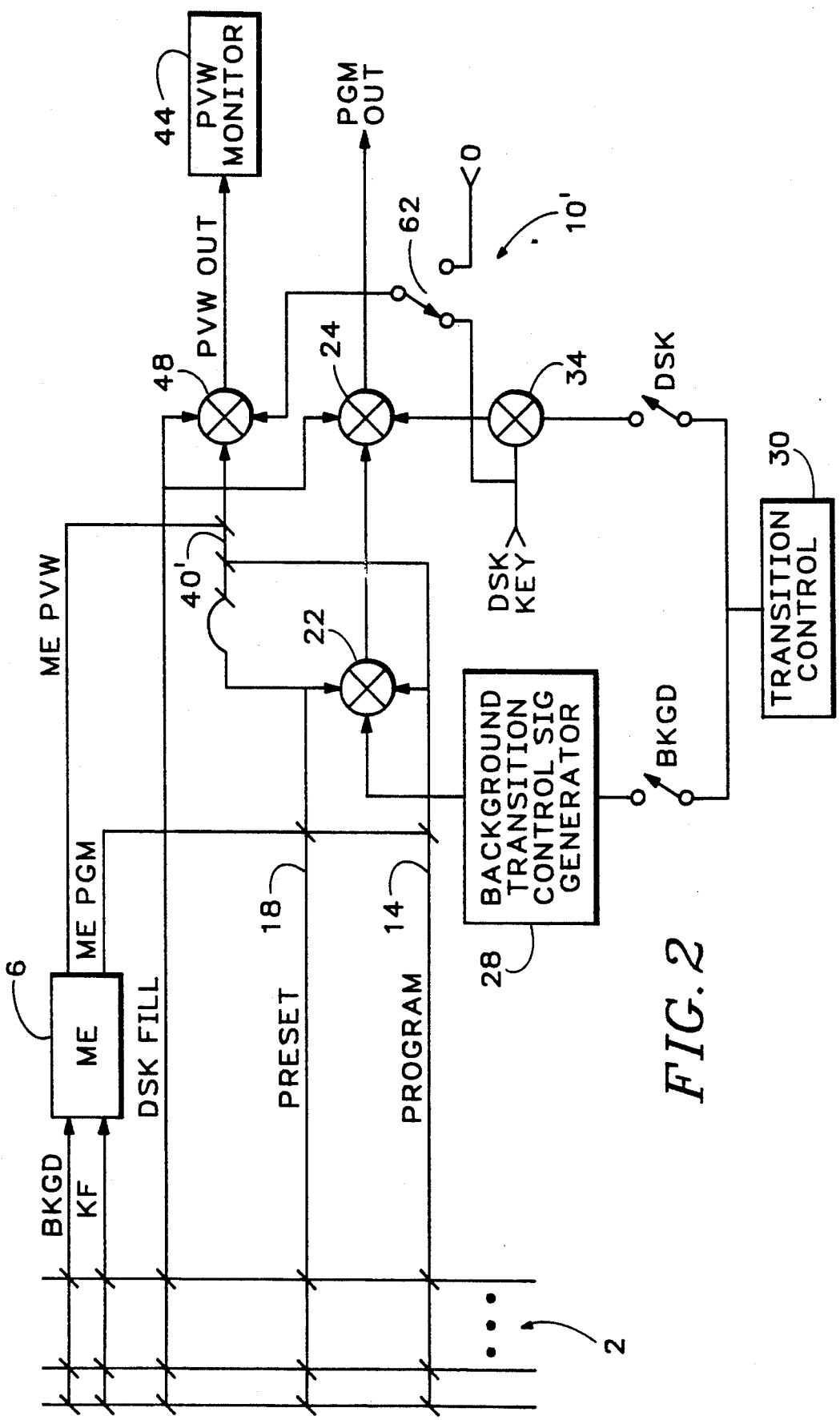
FIG. 2 is a block diagram of a production switcher embodying the present invention.

In the case of the FIG. 2 switcher, the preview selector 40' has inputs connected to the ME PVW output of ME device 6, the preset bus 18, and the program bus 14, and its output is connected to one video input of mixer. The output of mixer 48' is connected to the preview monitor The output of mixer 48' may therefore be composed of any one of PROGRAM, PRESET or ME PVW, either with or without DSK fill. Therefore, the preview monitor of the switcher shown in FIG. 2 can display the DSK fill layer against any of the three possible backgrounds. This enables the monitor to display a preview of any effect that can be produced using the transition controls of the ME device and the downstream keyer.

It will be appreciated that the invention is not restricted to the particular embodiment that has been described, and that variations may be made therein without departing from the scope of the invention as defined in the appended claims and equivalents thereof.

I claim:

1. A video production switcher comprising:
    a mix effects device for mixing a first selected video signal with a second selected video signal and producing a mix effects preview video signal at a preview output thereof,
    selector means having a first selector input connected to the preview output of the mix effects device, a second selector input connected to a second video source, and a selector output, the selector means being operative to connect either the first selector input or the second selector input to the selector output, and
    a preview mixer having a background input connected to the selector output, a key fill input connected to receive a key fill video signal, and a transition control input, the preview mixer being operative to combine a signal present at its background input with a signal present at its key fill input in dependence on a signal present at its transition control input to produce a preview output.

2. A video production switcher according to claim 1, wherein the second video source is a bus for selecting any one of a plurality of video signals.

3. A video production switcher according to claim 2, wherein the mix effects device also produces a mix effects program video output signal at a program output thereof and the mix effects program video output signal is one of said plurality of video signals.

4. A video production switcher according to claim 1 wherein the selector means comprise a bus having an output connected to the background input of the preview mixer and inputs connectable selectively to the preview output of the mix effects device or to the second video source.

5. A video production switcher according to claim 1, further comprising:
    a background mixer having a preset video input, a program video input, a background mixer transition control input, and a background output,
    a program bus for connecting a selected background video source to the program video input of the background mixer,
    a preset bus for connecting a second selected background video source to the preset video input of the background mixer, and a downstream key mixer having a downstream key mixer background input connected to the output of the background mixer, a downstream key mixer key fill input connected to receive the key fill video signal, a program output and a downstream key mixer transition control input, the downstream key mixer being operative to combine a signal present at its background input with a signal present at its key fill input in dependence on a signal present at its transition control input to produce a program output signal at its program output.

6. A video production switcher according to claim 5, wherein the selector means are effective to connect the background input of the preview mixer selectively either to the preview output of the mix effects device or to the preset bus or to the program bus.

7. A video production switcher according to claim 1, further comprising a preview monitor having an input connected to the preview output of the preview mixer, the preview monitor being operative to display an image based on the preview output of the preview mixer.

8. A video production switcher comprising:
a preview monitor having an input for receiving a preview video signal,
a preview mixer having a selected background video signal input, a downstream key fill video signal input, and a transition control input, and producing the preview video signal as an output, and
a preview selector having a mix effects preview video signal input and a second video signal input, and producing as an output the selected background video signal according to which input is selected, whereby the preview video signal can be made to be the mix effects preview video signal with or without the downstream key fill video signal mixed in or the second video signal with or without the downstream key fill video signal mixed in, depending on which input of the preview selector is selected and depending on the transition control input of the preview mixer.

9. A video production switcher according to claim 8, further comprising a mix effects device, the mix effects device receiving as inputs a background video signal and a key fill video signal, and producing as outputs the mix effects preview video signal and a mix effects program video signal, the mix effects program video signal being selectable as the second video signal input of the preview selector.

10. A video production switcher according to claim 8, further comprising:
a background mixer having the second video signal as a first video input, a third video signal as a second video input, and a background transition control signal as a control input, and producing a background program video output, and
a program output mixer having the background program video as a first video input, the downstream key fill video signal as a second video input, and a key control input, and producing an output program video signal from its first and second video inputs according to the key control input.

11. A video production switcher according to claim 8, comprising:
a preset bus for selecting any one of a plurality of a video signals as a preset bus signal, the preset bus being connected to the second video signal input of the preview selector,
a program bus for selecting any one of a plurality of video signals as a program bus signal, the program bus being connected to a third video signal input of the preview selector,
a background mixer having a preset video input connected to the preset bus, a program video input connected to the program bus, and a background transition control input, and producing a background video output, and
a program output mixer having the background video output as a first video input, the downstream key fill video signal as a second video input, and a key control input, and producing an output program video signal from its first and second video inputs according to the key control input.

* * * * *